March 26, 1940.  W. E. GUNDELFINGER ET AL  2,194,852
CORN POPPER
Filed Aug. 1, 1938
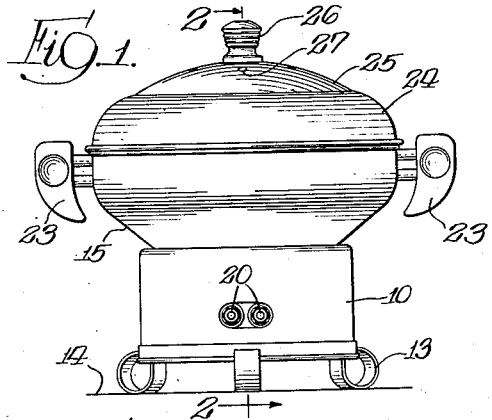
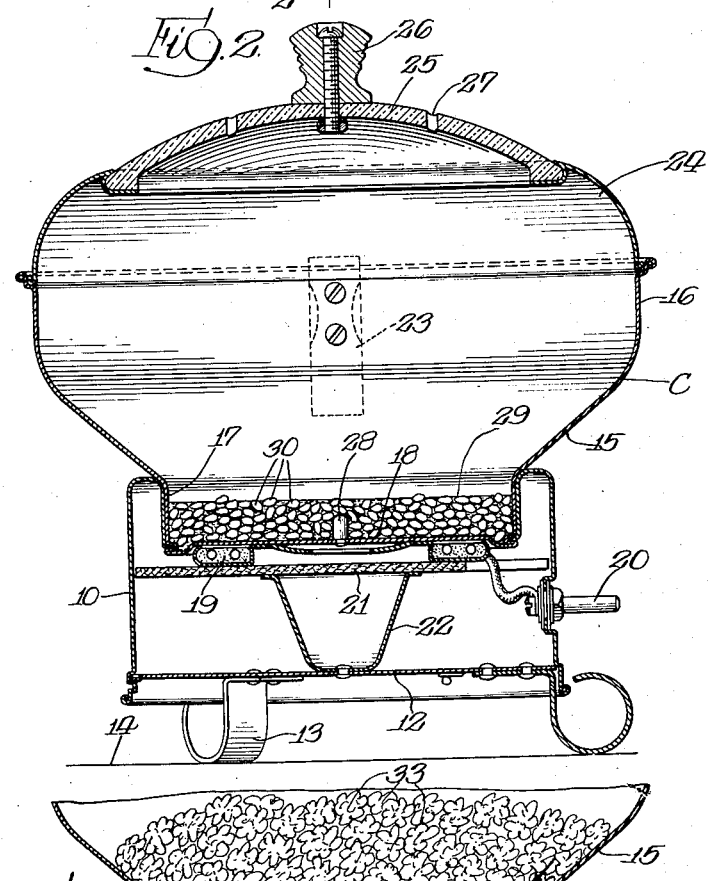
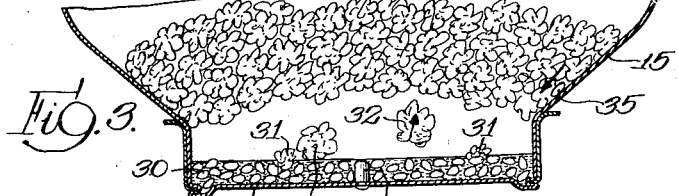
INVENTORS
William E. Gundelfinger
and Otto Lamb
BY Bair & Freeman ATTORNEYS Patented Mar. 26, 1940

2,194,852

UNITED STATES PATENT OFFICE 2,194,852

CORN POPPER

William E. Gundelfinger and Ollo Lamb, St. Louis, Mo., assignors to Knapp-Monarch Company, St. Louis, Mo., a corporation of Missouri Application August 1, 1938, Serial No. 222,457

9 Claims. (Cl. 53—4)

An object of our invention is to provide a corn popper of simple, durable and inexpensive construction in which all necessity of stirring or agitating the corn during the popping thereof is entirely eliminated.

Still a further object is to provide a corn popper which thoroughly heats the kernels of pop corn in a very effective manner throughout the entire volume of each kernel and thereby the kernels are popped in a minimum of time.

Still another object is to provide a corn popper in which cooking oil, lard, lard substitutes and the like can be preheated after which the kernals of pop corn are placed in the oil and absorb the desired amount of oil during the heating of the kernels so that when they are finally popped, the resulting popped corn is oiled to the desired degree without the necessity of any guess work or uneven oiling of the pop corn after it has been popped.

A further object is to provide a container for the popped corn of such shape that the corn after it is popped, even though it is further agitated by additional kernels of pop corn being popped, will remain out of the zone of greatest heat in the popper thereby preventing scorching, such zone being the bottom of the popper and the popper being so constructed with a well to receive cooking oil and pop corn that the well retains a layer of oil until all of the kernels of pop corn have been popped thus protecting the popped corn against being scorched against the bottom of the well.

Still a further object is to provide a corn popper having a transparent cover through which the popping action can be observed, means being provided to vent the popper so that condensate will not collect on the inner surface of the cover and fall back in the popped corn thus impairing its crispness.

With the above and other objects in view our invention consists of the novel combination, construction and arrangement of the parts and members shown in the attached drawing, wherein is illustrated a preferred embodiment of the invention as described in the following specification and particularly pointed out in the appended claims.

In the drawing:

Figure 1 is a rear elevation of a corn popper embodying our invention.

Figure 2 is a sectional view on the line 2—2 thereof showing the parts on an enlarged scale and the popper containing oil and pop corn; and Figure 3 is a sectional view similar to a portion of Figure 2 showing the corn partially popped.

On the accompanying drawing we have used the reference numeral 10 to indicate a base. The base 10 is inverted cup-shaped; its lower end being closed by a plate 12. Sheet metal feet 13 are secured to the plate 12 for supporting the popper on a table top or the like 14.

A pop corn container C is provided having a cone-shaped bottom wall 15 and a peripheral side wall 16. A well comprising a reduced peripheral wall 17 and a bottom wall 18 is provided preferably at the center of the cone shaped bottom 15. The inclination of the bottom 15 is approximately 40° to the horizontal and this angle is important for reasons which will hereinafter appear.

The well 17—18 is supported in a depressed upper portion of the base 10 and is heated by an electric heating element 19. The heating element 19 is supplied with current from a supply cord plugged on to terminal prongs 20 which extend from the back of the base 10. The heating element 19 is supported in contact with the bottom 18 of the well by a disk 21 of asbestos or other suitable insulating material and a cone-shaped support 22 secured to the center of the plate 12.

Handle members 23 are provided for the container C and these are preferably of such shape that they can be readily grasped between the thumb and forefingers of the operator so that the entire popper can be tipped forwardly for emptying it without danger of the operator's fingers coming in contact with heated metallic parts of the popper.

A cover is provided for the container C comprising an annular sheet metal member 24 and a transparent member 25. The member 25 permits observance of the popping action within the popper and is provided with a knob 26 for convenience in removing the cover. Vent openings 27 permit escape of steam caused by moisture in the popped corn being evaporated by heat during the popping operation. Such moisture if not permitted to escape fogs the inner surface of the transparent cover 25 and collects in the form of condensate which drops on to the popped corn and thereby impairs its crispness.

To eliminate guess work in the popping of corn, we prefer to supply the popper with a predetermined amount of pop corn. A measure may be provided for this purpose or a gauge pin 28 may be provided at the center of the well bottom 18 or any other suitable mark in the container C may be provided for this purpose.

We find that the corn is popped most readily and that maximum flavor can be obtained by first heating a cooking oil to a point where it starts to smoke and then pouring in sufficient pop corn to coincide with the level of the cooking oil.

In Figure 2 the oil is illustrated at 29 and the pop corn kernels at 30. A predetermined amount of the oil 29 is poured into the well 17—18, for instance, up to the top of the pin 28. Enough of the kernels 30 are then poured into the oil so that the level is substantially equal to the oil 29 which, of course, will then be elevated due to the displacement of the kernels.

The kernels immediately start to become heated throughout as they are immersed in the smoking hot oil 29 and soon start to expand as at 31 in Figure 3. When they burst as at 32 they are thrown upwardly by the bursting action into the container C. After a quantity of the corn has popped as at 33, it will start bridging across the cone-shaped bottom 15 as shown in this figure and thereafter only an occasional kernel of popped corn as indicated at 34 may fall back into the oil and pop corn which by this time has receded as illustrated. Any of these kernels 34, however, are soon propelled into the body of the popped corn 33 by additional kernels of corn popping and thereby being thrown upwardly.

We have experimented with various angles for the bottom wall 15 and found that approximately the one illustrated gives best results. This is due to an upward and outward inclination of the wall being necessary for the bridging action and for the further action of causing unpopped kernels of corn as at 35 to gravitate back into the well 17—18 if they happen to be thrown up into the popped corn 33.

Greater angle to the horizontal interferes with the bridging action while a greater angle to the vertical interferes with the return of unpopped corn that might settle on the wall 15. Gravitation of the kernels 35 back to the well are facilitated by agitation of the popped corn 33 due to the action of further kernels of corn bursting and thereby being propelled upwardly.

Our corn popper entirely eliminates the necessity of an agitator due to the continual self agitation of the corn as it pops. The bridging action of the popped corn at 33 also aids in the elimination of the necessity for a mechanical agitator as in most corn poppers by reason of the popped corn being held away from the heated bottom of the well. Any popped kernels of corn that do fall back into the well are soon thrown out again by the popping action.

The predetermined measured quantity of oil and corn produce the popper substantially full of popped corn and the action whereby unpopped kernels are returned to the well insures that all of the pop corn will be subjected to the heat of the oil and will thereby be popped with a minimum of unpopped kernels after popping has ceased. The pop corn will be found to have the proper amount of oil for best flavoring without the necessity of adding any more and since the pop corn kernels are initially submerged in the oil, the oil is evenly distributed throughout the pop corn in a manner impossible by the usual method of pouring oil over the corn after it is popped.

It is to be understood that the specific embodiment of our invention shown and described in our drawing and specification is for purpose of illustration only and that the invention is to be limited only by the scope of the appended claims. We intend to cover by our claims, modified forms of structure and use of mechanical equivalents such as will be reasonably included within their scope.

We claim as our invention:

1. In a corn popper, a container for popped corn, a restricted well at the bottom of said container for receiving cooking oil and pop-corn, an electric heater in intimate contact with the bottom wall of said well for heating it, the bottom wall of said container being an annular continuation of the upper edge of the periphery of said well and being inclined upwardly and outwardly therefrom at an angle of less than forty-five degrees to the horizontal.

2. In a corn popper, a container for popped corn, a well at the bottom of said container, means for heating said well, the bottom wall of said container being an annular continuation of the upper edge of the periphery of said well and being inclined upwardly and outwardly therefrom at an angle of substantially forty degrees to the horizontal.

3. In a corn popper, a container for popped corn, a well at the bottom of said container for receiving cooking oil and pop-corn, the diameter of said well being substantially less than the diameter of said container, an electric heating element for heating said well, said heating element being in intimate contact with the bottom of said well, the bottom wall of said container being a continuation of the upper edge of the periphery of said well.

4. In a corn popper, a container for popped corn, a well at the bottom of said container, the diameter of said well being substantially less than the diameter of said container, means for heating said well, the bottom wall of said container being a continuation of the upper edge of the periphery of said well and being inclined upwardly and outwardly therefrom at an angle less than forty-five degrees to the horizontal.

5. In a corn popper, a well for receiving a predetermined amount of cooking oil and pop corn, means for heating said well and a container for the corn after it is popped comprising a bottom wall extending from the periphery of said well and a peripheral wall extending upwardly from the periphery of said bottom wall, said bottom wall being inclined inwardly and downwardly toward said well, the degree of inclination being sufficiently great relative to the horizontal to permit unpopped kernels of corn, when thrown out of said well by the popping action of other kernels therein, to gravitate back to said well and sufficiently great relative to the vertical to prevent popped corn from so gravitating during agitation thereof caused by popping kernels of corn.

6. In a corn popper, a well for receiving cooking oil and pop corn, means for heating said well and a container for the corn after it is popped comprising a bottom wall extending from the periphery of said well and a peripheral wall extending horizontally upward from the periphery of said bottom wall, said bottom wall being inclined inwardly and downwardly toward said well, the degree of inclination being sufficiently great relative to the horizontal to permit unpopped kernels of corn when thrown out of said well by the popping action by other kernels therein to gravitate slowly back to said well as the popped corn is agitated by additional popping kernels of corn.

7. In a corn popper, a well for receiving cooking oil and pop corn, means for heating said well and a container for the corn after it is popped comprising a bottom wall extending from the periphery of said well and a peripheral wall extending horizontally upward from the periphery of said bottom wall, said bottom wall being inclined inwardly and downwardly toward said well, the degree of inclination being sufficiently great relative to the vertical to prevent popped corn from gravitating back to said well as it is agitated by additional popping kernels of corn.

8. In a corn popper, a well, means for heating said well and a container for the corn after it is popped including a bottom wall extending outwardly from the periphery of said well, said bottom wall being inclined inwardly and downwardly toward said well and the degree of inclination being sufficiently great relative to the horizontal to permit unpopped kernels of corn when thrown out of said well by the popping action of other kernels therein to slowly gravitate back to said well and sufficiently great relative to the vertical to prevent popped corn from so gravitating.

9. In a corn popper, a well for receiving cooking oil and pop corn, means for heating said well and a container for the corn after it is popped including a bottom wall extending from the periphery of said well, said bottom wall being inclined inwardly and downwardly toward said well and the degree of inclination being sufficiently great relative to the vertical to cause popped corn to substantially bridge said well after it is thrown out of the well by the popping action of the corn in the well.

WILLIAM E. GUNDELFINGER.
OLLO LAMB.